United States Patent Office 3,317,444
Patented May 2, 1967

3,317,444
BUTYL RUBBER VULCANIZATES PREPARED FROM COMPOSITIONS COMPRISING FACTICE, PHENOLIC CURING AGENT AND AROMATIC AMINE
Barry Topcik, Somerville, N.J., assignor to Columbian Carbon Company, New York, N.Y., a corporation of Delaware
No Drawing. Filed June 21, 1963, Ser. No. 289,738
4 Claims. (Cl. 260—19)

This invention relates to a method for compounding butyl rubber and more particularly provides a method for preparing butyl rubber compounds which have excellent aging qualities and other desirable characteristics.

The term "butyl rubber" as used herein and in the appended claims is intended to designate vulcanizable rubbery copolymers of low unsaturation, such as are produced by copolymerizing a major proportion of an iso-olefin of 4 to 7 carbon atoms with a minor proportion of a multiolefin of 4 to 8 carbon atoms. The presently preferred iso-olefin for this purpose is isobutylene although other iso-olefins such as 3-methyl-1-butene or 4-methyl-1-pentene may be employed. Multi-olefins suitable for this purpose are advantageously conjugated diolefins, for instance, isoprene, butadiene and the like.

These butyl rubber copolymers are usually prepared by copolymerizing about 0.5 to 15 weight percent of conjugated diolefin, preferably isoprene, with about 85 to 99.5 weight percent of isobutylene at a reaction temperature below about $-100°$ F. and in the presence of Friedel-Crafts catalyst, preferably $AlCl_3$, dissolved in a low-freezing, non-complex forming solvent, such as methyl chloride. Copolymers produced by reacting 95 to 99.5% isobutylene with 0.5 to 5% isoprene have been found to be particularly desirable from a commercial standpoint. As is known in the art, small amounts of one or more additional hydrocarbon reactants, such as divinyl benzene or cyclopentadiene, may also be present during the polymerization reaction. Generally, the butyl rubber product has a Staudinger molecular weight between about 20,000 and 300,000 or higher and a Wijs iodine number of from about 0.5 to 50. These butyl rubbers are further described in U.S. Patent 2,356,128 of Thomas et al. and in the text entitled, "Synthetic Rubber," by G. S. Whitby, 1954 Edition, published by John Wiley and Sons, Inc.

It is well known that butyl rubber is generally superior to other elastomers with respect to aging properties, or, in other words, the ability of the rubber to withstand high temperature and extreme mechanical stress for a prolonged period of time without undergoing chain scissioning and physical property deterioration. As a result, butyl rubber has been preferentially used in applications where excellent aging is a prime consideration, for instance, in the manufacture of curing bladders or diaphragms used to assist in the shaping and vulcanization of pneumatic tires.

In operation, the curing bladder is disposed within the raw tire casing and is inflated by means of a hot fluid, usually hot water, which causes the bladder to expand and force the tire casing outwardly against the walls of the mold in which it is vulcanized. When the tire casing is vulcanized, the curing bladder is collapsed from the tire by vacuum and is inserted in another raw tire casing for a repetition of the operation. Thus, the curing bladder is repeatedly and continuously subjected to extreme conditions of flexing and heat which collectively tend to shorten its usable life.

When compounding butyl rubber for ultimate use in the manufacture of tire curing bladders, or other applications wherein excellent resistance to aging under the influence of flexing or heat or both is an important requirement, it is well known to employ a phenolic curing system for the rubber. Phenolic materials suitable for this purpose are described in the patent and other literature and are familiar to those skilled in the art. Especially preferred phenolic curing agents are the dimethylol phenols, prepared by reacting formaldehyde to a phenol in a molar ratio of about 2:1 in the presence of alkali, and the condensation resins thereof.

Generally, a halogen liberating compound is employed in a phenolic curing system to catalyze the vulcanization reaction, although when a halogen-containing phenolic curing agent is employed, for instance, a bromomethyl alkylated phenol-formaldehyde resin, a vulcanization accelerator is generally not necessary.

Although phenolic-cured butyl rubber compositions are characterized by excellent aging qualities, it would be highly desirable to obtain still further improvements in these qualities, and consequently in the serviceable life of articles manufactured therefrom.

My present invention provides a method for preparing phenolic-cured butyl rubber compounds which are particularly characterized by an improved resistance to aging upon being subjected to high temperatures or flexing or both and which have other desirable properties. My invention may be used with particular advantage in the production of tire curing bladders having a greatly lengthened serviceable life. Various other objects and advantages of the invention will appear from the following detailed description thereof, and the novel features thereof will be particularly pointed out hereinafter in connection with the appended claims.

In accordance with my present invention, I have found that the aging qualities of butyl rubber and the serviceable life of articles manufactured therefrom may be greatly improved by compounding the rubber with a factice and thereafter vulcanizing the composition with a phenolic curing agent for the rubber.

Factices, as defined herein, are elastic gums prepared by reacting unsaturated vegetable oils, with sulfur or sulfur containing compounds. In general, factices can be classified in two main groups: the sulfur factices which are prepared by heating unsaturated vegetable oils with sulfur, and are fully or essentially saturated in nature, and the sulfur chloride factices which are prepared by the action of sulfur chloride on vegeatable oils, and possess an appreciable amount of unsaturation. Usually, but not necessarily, the sulfur factices are brown or amber in color and are, therefore, sometimes called brown factices, while the sulfur chloride factices are white in color and are commonly called white factices. Unsaturated vegetable oils commonly used in the preparation of factices are rape-seed oil, olive oil, soybean oil, cashew nut oil and cottonseed oil.

I have found the sulfur factices to be especially effective for enhancing the aging qualities of phenolic-cured butyl rubber compounds although the sulfur chloride factices may be used with some advantage for this purpose. While I do not intend to limit my invention by any theory, it is my present conviction that the sulfur factices are more suitable than the sulfur chloride factices because they are fully or essentially saturated in nature, and, therefore, do not tend to deleteriously interfere with the vulcanization of butyl rubber by depriving the rubber of the use of curvatives.

The addition of factice in an amount of as little as 3 parts per 100 parts of butyl rubber by weight will give useful results in accordance with the invention, although superior results are obtained when 5 parts or more of factice are added per 100 parts of butyl. It is generally not necessary to use more than about 20 parts of factice per 100 parts of butyl since additional advantages in properties are not obtained. If desired, a mixture of different factices may be used.

Phenolic materials useful as curing agents for butyl rubber are, as previously noted, well known to the art, and include, for instance, the monomeric and resinous forms of the 2,6-dimethylol-4-hydrocarbon phenols, wherein the hydrocarbon substituent is an alkyl group of 3 to 20 carbon atoms (e.g. octyl), a cycloalkyl group (e.g. cyclopentyl), an aryl group (e.g. phenyl) or an aralkyl group (e.g. benzyl); the reaction products of formaldehyde and 3,5-dialkyl phenols; the reaction products of formaldehyde and 3,4,5-trialkyl phenols; the 2,6-dimethylol-4-halo phenols; the 2,6-di(acyloxymethyl)-4-hydrocarbon substituted phenols; the 2,6-di(alkoxymethyl)-4-hydrocarbon substituted phenols, etc.

Compounds obtained by halogenating 2,6-dimethylol-4-hydrocarbon phenols so as to at least patrially substitute halogen for the hydroxyl portion of the methylol groups may be used. Suitable halogenating agents are hydrogen bromide and hydrogen chloride.

Advantageously, the phenolic curing agent is used in an amount of from 3 to 20 parts per 100 parts of butyl rubber by weight, but best results are obtained employing 8 to 15 parts per 100 parts of rubber.

As previously noted, it is generally desirable to use a halogen liberating substance, for instance, polychloroprene, heavy metal halides, chlorinated paraffin wax or chlorosulfonated polyethylene, in combination with the phenolic curing agent for the purpose of catalyzing or accelerating the vulcanization reaction. However, this is not essential, particularly when a halogen-containing phenolic curing agent is employed.

In accordance with a preferred aspect of my present invention, I have found that the use of an amine type antioxidant in combination with a factice results in a still further improvement in the flex crack life of phenolic-cured butyl rubber compositions and consequently in the serviceable life of curing bladders produced therefrom. Amines suitable for this purpose include the diarylamines such as the diphenylamines and phenylnapthylamines, the reaction products of aldehydes and primary aromatic amines, the reaction products of acetone and aniline or para-substiuted anilines, the reaction products of acetone with diphenylamine or phenyl-β-napthylamines, p-phenylenediamine and derivatives thereof, such as N,N'-diphenyl-p-phenylenediamine.

For the purpose of preparing factice-containing phenolic-cured butyl rubber compounds having an increased resistance to flex cracking, I have found that the amine type antioxidant should be added to the unvulcanized compound in an amount of from about 0.5 to 2 parts per 100 parts of butyl rubber by weight, advantageously in an amount of about 1 part per 100 parts of rubber.

Of course, in addition to factice, amine antioxidant and the phenolic curing system, other ingredients such as carbon black, silica, plasticizers, waxes, etc. may be compounded with the butyl rubber prior to curing, according to the desires of the formulator.

The butyl rubber and compounding ingredients may be mixed together in any desired order in accordance with conventional procedures used in mixing rubber compounds, with the aid of conventional rubber mixed equipment, for instance a Banbury mixer or a roll mill. The vulcanizable composition may then be fabricated into the desired form by the usual molding, extruding of calendering operations, and subsequently vulcanized by heating to a vulcanizing temperature. The vulcanization process may conveniently be carried out at a temperature of from about 200° to 400° F., for a period of time ranging from about 5 to 100 minutes, although it is generally preferred to use a temperature within the range of from about 300° to 370° F. and a time of from 15 to 60 minutes.

As previously noted, the vulcanized compositions of my present invention have excellent aging qualities, and may be used with particular advantage in the manufacture of tire curing bladders. However, the particular applicability of these compositions as curing bladder stocks does not preclude their use in other applications wherein an excellent resistance to aging under the influence of flexing or heat or both is an important requirement, for instance, steamhose, hot water bottles, flexible air ducts, drive belts for machinery etc.

My invention and the advantages thereof will now be further described by the following specific illustration which is not to be interpreted as limitative.

In this operation, a masterbatch of butyl rubber and carbon black was prepared which was subsequently formulated in a Banbury mixer in accordance with the recipes tabulated in Table 1. Compositions B and C, it will be noted, were formulated with "Amberex BR" factice which is a member of the sulfur factice family and is a vulcanized reaction product of rape-seed oil and sulfur. "Amberex BR" has an ash content of 1.0%, a solubility in acetone of 6% to 8%, an acetone-soluble sulfur content of 1.5% and a specific gravity of 1.03.

The butyl rubber employed in all compositions was "Enjay Butyl 218," a low unsaturation isobutylene-isoprene copolymer having a Mooney viscosity of 71+(ML-8 at 212° F.). The phenolic curing agent was "Schenectady SP-1055 Resin" which is a bromomethyl, alkylated phenolformaldehyde resin. As the resin contained halogen in the form of bromine, a vulcanization catalyst was not employed.

It will also be noted, that composition A, which served as the control, and composition C were formulated with an amine type antioxidant, specifically, an admixture of di - p - methoxydiphenylamine, di - phenyl-p-phenylenediamine and phenyl-β-naphthylamine, marketed commercially as "Thermoflex A."

The compounding recipes, in which the amounts of ingredients are given in parts by wieght, and the physical properties of the compositions cured at 330° F. were:

TABLE I

| Recipe | Compositions | | |
|---|---|---|---|
| | A | B | C |
| INGREDIENTS | | | |
| Butyl rubber | 100 | 100 | 100 |
| Carbon black (active low structure—HAF) | 47.5 | 47.5 | 47.5 |
| Zinc oxide | 5 | 5 | 5 |
| Thermoflex A antioxidant | 1 | | 1 |
| Amberex BR factice | | 5 | 5 |
| Resin SP-1055 | 12 | 12 | 12 |
| RUBBER PROPERTIES | | | |
| Cured at 330° F.: | | | |
| 20' Modulus (p.s.i.) L-300 | 600 | 720 | 550 |
| 20' Tensile strength (p.s.i.) | 2,600 | 2,220 | 2,170 |
| 60' L-300 | 980 | 750 | 580 |
| 60' Tensile | 2,820 | 2,570 | 2,290 |
| 60' Elongation (percent) | 655 | 715 | 810 |
| 60' Shore hardness | 55 | 50 | 50 |
| Maximum Tensile | 2,820 | 2,570 | 2,320 |
| Oven aged 48 hours at 300° F.: | | | |
| 60' L-300 | 1,200 | 950 | 860 |
| 60' Tensile | 2,120 | 2,000 | 1,640 |
| 60' Elongation | 490 | 515 | 535 |
| 60' Shore hardness | 52 | 52 | 54 |
| Percent Elongation retained | 75 | 72 | 66 |
| Percent Tensile retained | 75 | 78 | 72 |
| Hardness-points change | 3 | +2 | +4 |
| Oven aged 96 hours at 300° F.: | | | |
| 60' L-300 | 1,000 | 1,020 | 810 |
| 60' Tensile | 1,730 | 1,950 | 1,470 |
| 60' Elongation | 465 | 505 | 525 |
| 60' Shore hardness | 55 | 52 | 53 |
| Percent Tensile retained | 61 | 76 | 64 |
| Percent Elong. retained | 71 | 71 | 65 |
| Hardness-pts. change | 0 | +2 | +3 |
| DeMattia Flex at 190° F. (Samples aged 96 hours at 300° F.), Crack Growth to 50% failure-kilocycles: | | | |
| Run No. 1 | 6 | 50 | 180 |
| Run No. 2 | 6 | 30 | 240 |
| 60' Crescent Tear— | | | |
| At R. T. | 265 | 300 | 375 |
| At 212° F | 160 | 160 | 195 |

To summarize the above results, compositions B and C, formulated with factice, showed significantly better aged flex properties as indicated by the De Mattia flex test, and retained their physical properties upon severe heat aging to a degree at least equivalent to and in most cases greater than composition A, formulated without factice.

The flexing properties exhibited by composition C, wherein an antioxidant was employed in addition to factice, are particularly noteworthy. In view of the flexing properties exhibited by compositions A and B, which were compounded with an antioxidant and a factice respectively, one skilled in the art would normally conclude that little or no additional benefits in these properties would accrue from using an antioxidant in combination with factice. However, I have surprisingly found, as is dramatically shown by the above-results, that when an amine type antioxidant is used in combination with factice in a phenolic-cured butyl rubber composition, a synergistic effect occurs which results in a greatly improved resistance of the compound to flex cracking. Specifically, composition C had a flex crack life approximately 35 times better than that of the control and approximately 5 times better than that of composition B.

As will also be noted from the above results, the addition of factice to the rubber compound generally increased tear resistance and had the further effect of increasing the hardness of the stocks upon aging.

Compositions B and C characterized by an excellent balance of tear, heat aging and flex properties could be used with particular advantage in the manufacture of tire curing bladders or in other applications where these characteristics are desirable.

I claim:

1. An improved butyl rubber vulcanizate particularly characterized by excellent aging qualities, said vulcanizate obtained by vulcanizing a composition comprising 100 parts by weight of butyl rubber, a factice in an amount of from 3 to about 20 parts per 100 parts of rubber, a phenolic curing agent in an amount of from 3 to 20 parts per 100 parts of rubber and from about 0.5 to about 2 parts of an aromatic amine antioxidant per 100 parts of rubber.

2. A vulcanizate as in claim 1, wherein the factice comprises a reaction product of sulfur and an unsaturated vegetable oil.

3. A tire curing bladder comprising the vulcanizate of claim 1.

4. A tire curing bladder comprising the vulcanizate of claim 2.

References Cited by the Examiner

UNITED STATES PATENTS

| | | | |
|---|---|---|---|
| 2,451,865 | 10/1948 | O'Brien | 260—23.7 |
| 2,727,874 | 12/1955 | Peterson et al. | 260—19 |
| 2,996,465 | 8/1961 | Phillips | 260—41.5 |
| 3,007,889 | 11/1961 | Smith | 260—41.5 |
| 3,031,423 | 4/1962 | Meier | 260—23.7 |
| 3,102,104 | 8/1963 | Brice | 260—846 |
| 3,183,268 | 5/1965 | Wilson | 260—45.9 |
| 3,250,733 | 5/1966 | Giller | 260—846 |

OTHER REFERENCES

Compounding Ingredients for Rubber, 3rd edition (1961), page 294, Copy in Group 140, TS 1890 I53 C2.

Flint et al., Rubber Journal and International Plastics (1958), pp. 667 and 725–728, Copy in S.L., TS 1870 I4.

Wilson, "British Compounding Ingredients for Rubber" (1958), pp. 249, 273, 280 and 295, TS 1890 W58C2.

Compounding Ingredients for Rubber (1962), 3rd edition, pp. 18, 102 and 138, TS 1890 I 53.

LEON J. BERCOVITZ, *Primary Examiner.*

DONALD E. CZAJA, *Examiner.*

R. A. WHITE, *Assistant Examiner.*